US010544375B2

(12) United States Patent
Liu et al.

(10) Patent No.: US 10,544,375 B2
(45) Date of Patent: Jan. 28, 2020

(54) GASIFICATION SYSTEM AND PROCESS

(71) Applicant: Air Products and Chemicals, Inc., Allentown, PA (US)

(72) Inventors: Sijing Liu, Amsterdam (NL); Manfred Heinrich Schmitz-Goeb, Gummersbach (DE); Anthony Wolfert, Amsterdam (NL); Unai Jauregi, Amsterdam (NL); Joachim Ottomar Wolff, Amsterdam (NL)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 16/062,297

(22) PCT Filed: Dec. 15, 2016

(86) PCT No.: PCT/EP2016/081182
§ 371 (c)(1),
(2) Date: Jun. 14, 2018

(87) PCT Pub. No.: WO2017/102940
PCT Pub. Date: Jun. 22, 2017

(65) Prior Publication Data
US 2018/0371340 A1    Dec. 27, 2018

(30) Foreign Application Priority Data
Dec. 16, 2015 (EP) .................................. 15200401

(51) Int. Cl.
*C10J 3/84* (2006.01)
*C01B 3/36* (2006.01)

(52) U.S. Cl.
CPC ................ *C10J 3/845* (2013.01); *C01B 3/36* (2013.01); *C10J 2300/093* (2013.01); *C10J 2300/0916* (2013.01); *C10J 2300/0926* (2013.01)

(58) Field of Classification Search
CPC ................................... C10J 3/845; C01B 3/36
(Continued)

(56) References Cited

U.S. PATENT DOCUMENTS

| 4,247,302 A * | 1/1981 | Woldy ....................... C10J 3/08 |
| | | 122/7 R |
| 2008/0034657 A1 * | 2/2008 | Van Den Berg ......... C10J 3/485 |
| | | 48/62 R |

(Continued)

FOREIGN PATENT DOCUMENTS

| KR | 20070086520 A | 8/2007 |
| WO | 2006053905 A1 | 5/2006 |
| WO | 2008110592 A1 | 9/2008 |

OTHER PUBLICATIONS

European International Search Report and Written Opinion of the International Searching Authority, dated Mar. 7, 2017, for PCT/EP2016/081182.
(Continued)

*Primary Examiner* — Douglas B Call
(74) *Attorney, Agent, or Firm* — Amy Carr-Trexler

(57) ABSTRACT

A gasification system for the partial oxidation of a carbonaceous feedstock to at least provide a synthesis gas, the system comprising a reactor chamber and a quench section below the reactor chamber. An intermediate section connecting the reactor chamber to the quench section comprises at least one layer of refractory bricks arranged on and supported by the reactor chamber floor, the refractory bricks enclosing a reactor outlet opening. A membrane wall extends downwardly from the reactor outlet opening of the
(Continued)

reactor chamber floor. A pump system is provided communicating with a source of a liquid coolant for circulating the liquid coolant through the tubes of the membrane wall.

15 Claims, 7 Drawing Sheets

(58) Field of Classification Search
USPC .......................................................... 252/373
See application file for complete search history.

(56) References Cited

U.S. PATENT DOCUMENTS

| | | | |
|---|---|---|---|
| 2008/0041572 A1 | 2/2008 | Wessel et al. | |
| 2009/0202403 A1* | 8/2009 | Jimenez-Huyke | C01B 3/36 |
| | | | 422/198 |
| 2011/0120010 A1* | 5/2011 | Tiwari | C10J 3/84 |
| | | | 48/87 |
| 2011/0162381 A1 | 7/2011 | Thacker et al. | |
| 2013/0175476 A1* | 7/2013 | Kumar | C10J 3/485 |
| | | | 252/373 |
| 2015/0137040 A1* | 5/2015 | Pan | C10J 3/485 |
| | | | 252/373 |

OTHER PUBLICATIONS

Korean Office Action dated Jun. 19, 2019, 5 pgs.

\* cited by examiner

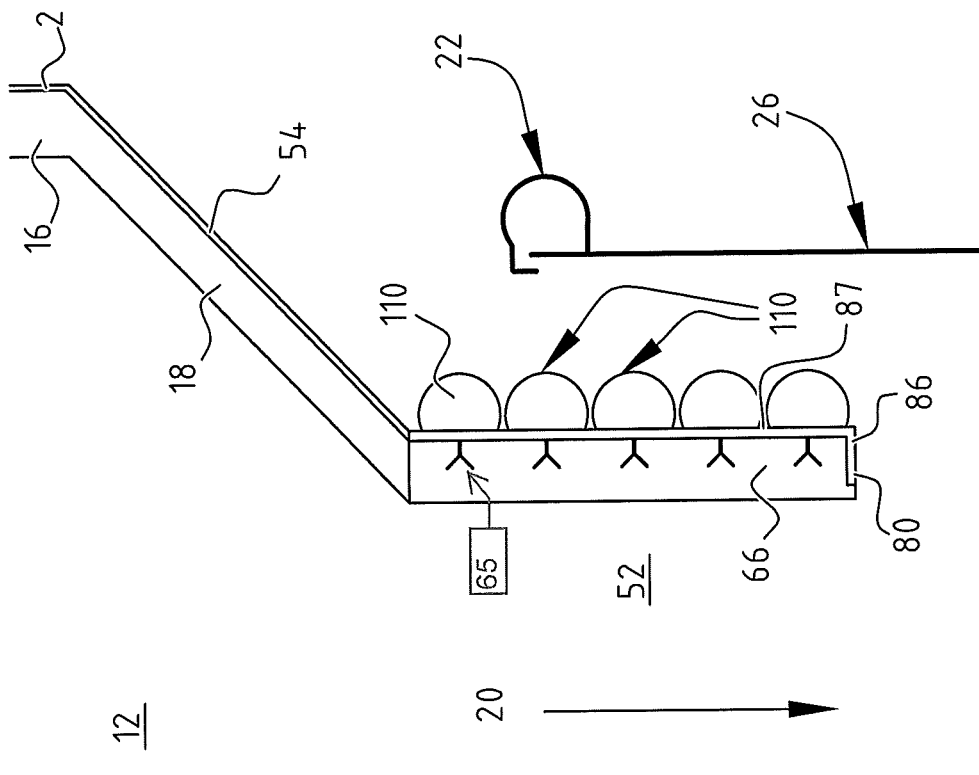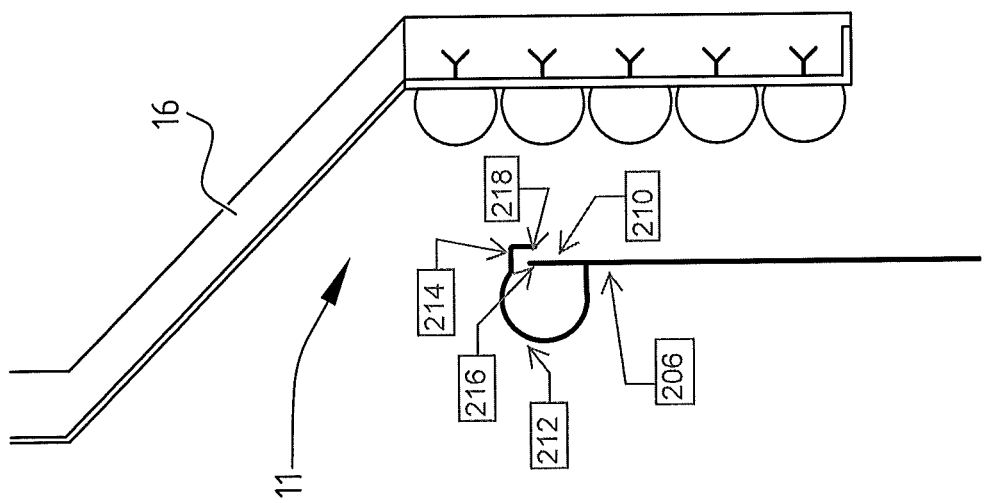

GASIFICATION SYSTEM AND PROCESS

The invention relates to a gasification system and a process for the production of synthesis gas by partial combustion of a carbonaceous feed.

The carbonaceous feed can for instance comprise pulverized coal, coal slurry, biomass, (heavy) oil, crude oil residue, bio-oil, hydrocarbon gas or any other type of carbonaceous feed or mixture thereof. A liquid carbonaceous feed can for instance comprise coal slurry, (heavy) oil, crude oil residue, bio-oil or any other type of liquid carbonaceous feed or mixture thereof.

Syngas, or synthesis gas, as used herein is a gas mixture comprising hydrogen, carbon monoxide, and potentially some carbon dioxide. The syngas can be used, for instance, as a fuel, or as an intermediary in creating synthetic natural gas (SNG) and for producing ammonia, methanol, hydrogen, waxes, synthetic hydrocarbon fuels or oil products, or as a feedstock for other chemical processes.

The disclosure is directed to a system comprising a gasification reactor for producing syngas, and a quench chamber for receiving the syngas from the reactor. A syngas outlet of the reactor is fluidly connected with the quench chamber via a tubular diptube. Partial oxidation gasifiers of the type shown in, for instance, U.S. Pat. Nos. 4,828,578 and 5,464,592, include a high temperature reaction chamber surrounded by one or more layers of insulating and refractory material, such as fire clay brick, also referred to as refractory brick or refractory lining, and encased by an outer steel shell or vessel.

A process for the partial oxidation of a liquid, hydrocarbon-containing fuel, as described in WO9532148A1, can be used with the gasifier of the type shown in the patent referenced above. A burner, such as disclosed in U.S. Pat. Nos. 9,032,623, 4,443,230 and 4,491,456, can be used with gasifiers of the type shown in the previously referred to patent to introduce liquid hydrocarbon containing fuel, together with oxygen and potentially also a moderator gas, downwardly or laterally into the reaction chamber of the gasifier.

As the fuel reacts within the gasifier, one of the reaction products may be gaseous hydrogen sulfide, a corrosive agent. Slag or unburnt carbon may also be formed during the gasification process, as a by-product of the reaction between the fuel and the oxygen containing gas. The reaction products and the amount of slag may depend on the type of fuel used. Fuels comprising coal will typically produce more slag than liquid hydrocarbon comprising fuel, for instance comprising heavy oil residue. For liquid fuels, corrosion by corrosive agents and the elevated temperature of the syngas is more prominent.

Slag or unburnt carbon is also a well known corrosive agent and gradually flows downwardly along the inside walls of the gasifier to a water bath. The water bath cools the syngas exiting from the reaction chamber and also cools any slag or unburnt carbon that drops into the water bath.

Before the downflowing syngas reaches the water bath, it flows through an intermediate section at a floor portion of the gasification reactor and through the dip tube that leads to the water bath.

The gasifier as described above typically also has a quench ring. A quench ring may typically be formed of a corrosion and high temperature resistant material, such as chrome nickel iron alloy or nickel based alloy such as Incoloy®, and is arranged to introduce water as a coolant against the inner surface of the dip tube.

The gasifiers of U.S. Pat. Nos. 4,828,578 and 5,464,592 are intended for a liquid fuel comprising a slurry of coal and water, which will produce slag. Some portions of the quench ring are in the flow path of the downflowing molten slag and syngas, and the quench ring can thus be contacted by molten slag and/or the syngas. The portions of the quench ring that are contacted by hot syngas may experience temperatures of approximately 1800° F. to 2800° F. (980 to 1540° C.). The prior art quench ring thus is vulnerable to thermal damage and thermal chemical degradation. Depending on the feedstock, slag may also solidify on the quench ring and accumulate to form a plug that can restrict or eventually close the syngas opening. Furthermore any slag accumulation on the quench ring will reduce the ability of the quench ring to perform its cooling function.

In one known gasifier the metal floor portion of the reaction chamber is in the form of a frustum of an upside down conical shell. The intermediate section may comprise a throat structure at a central syngas outlet opening in the gasifier floor.

The metal gasifier floor supports refractory material such as ceramic brick and/or insulating brick, that covers the metal floor, and also supports the refractory material that covers the inner surface of the gasifier vessel above the gasifier floor. The gasifier floor may also support the underlying quench ring and dip tube.

A peripheral edge of the gasifier floor at the intermediate section, also know as a leading edge, may be exposed to the harsh conditions of high temperature, high velocity syngas (which may have entrained particles of erosive ash, depending on the nature of the feedstock) and unburnt carbon (and/or slag). Herein, the amount of slag may also depend on the nature of the feedstock.

In a prior art gasification system, the metal floor suffered wastage in a radial direction (from the center axis of the gasifier), beginning at the leading edge and progressing radially outward until the harsh conditions created by the hot syngas are in equilibrium with the cooling effects of the underlying quench ring. The metal wasting action thus progresses radially outward from a center axis of the gasifier until it reaches an "equilibrium" point or "equilibrium" radius.

The equilibrium radius is occasionally far enough from the center axis of the gasifier and the leading edge of the floor such that there is a risk that the floor can no longer sustain the overlying refractory. If refractory support is in jeopardy, the gasifier may require premature shut down for reconstructive work on the floor and replacement of the throat refractory, a very time intensive and laborious procedure.

Another problem at the intermediate section or throat section of the prior art gasifier is that the upper, curved surface of the quench ring is exposed to full radiant heat from the reaction chamber of the gasifier, and the corrosive and/or erosive effects of the high velocity, high temperature syngas which can include ash and unburnt carbon (and slag). Such harsh conditions can also lead to wastage problems of the quench ring which, if severe enough, can force termination of gasification operations for necessary repair work. This problem is exacerbated if the overlying floor has wasted away significantly, exposing more of the quench ring to the hot gas and unburnt carbon.

It was reported that the above described design had experienced frequent failures such as wearing off and corrosion of the refractory bricks, metal floor and the quench ring. The throat section, i.e. the interface between the reactor and the quench section, may have the following problems:

the metal supporting structure at the bottom of the intermediate section and reactor outlet is vulnerable to wear caused by the high temperature and corrosive hot gas;

the interface between the hot dry reactor and the wet quench area is vulnerable to fouling; and the quench ring has a risk of overheating by hot syngas.

U.S. Pat. No. 4,801,307 discloses a refractory lining, wherein a rear portion of the flat underside of the refractory lining at the downstream end of the central passage is supported by the quench ring cover while a front portion of the refractory lining overhangs the vertical leg portion of the quench ring face and cover. The overhang slopes downward at an angle in the range of about 10 to 30 degrees. The overhang provides the inside face with shielding from the hot gas. A refractory protective ring may be fixed to the front of an inside face of the quench ring.

U.S. Pat. No. 7,141,085 discloses a gasifier having a throat section and a metal floor with a throat opening at the throat section, the throat opening in the metal floor being defined by an inner peripheral edge of the metal gasifier floor. The metal gasifier floor has an overlying refractory material, and a hanging refractory brick at the inner peripheral edge of the metal floor having a bottom portion including an appendage, the appendage having a vertical extent being selected to overhang a portion of the inner peripheral edge of the metal gasifier floor. A quench ring underlies the gasifier floor at the inner peripheral edge of the gasifier floor, the appendage being sufficiently long to overhang the upper surface of the quench ring.

U.S. Pat. No. 9,057,030 discloses a gasification system having a quench ring protection system comprising a protective barrier disposed within the inner circumferential surface of the quench ring. The quench ring protection system comprises a drip edge configured to locate dripping molten slag away from the quench ring, and the protective barrier overlaps the inner circumferential surface along greater than approximately 50 percent of a portion of an axial dimension in an axial direction along an axis of the quench ring, and the protective barrier comprises a refractory material.

U.S. Pat. No. 9,127,222 discloses a shielding gas system to protect the quench ring and the transition area between the reactor and the bottom quench section. The quench ring is located below the horizontal section of the metal floor of the gasification reactor.

According to patent literature, one of the most common corrosion spots is at the front of the quench ring, which is the device that injects a film of water on the inside of the dip tube at the point where the membrane wall or the refractory ends. The quench ring is not only directly exposed to the hot syngas, but may also suffer from insufficient cooling when gas collects in the top, and thermal overload and/or corrosion can occur.

Long term operation of the prior art designs described above has indicated a few issues. For instance, the designs protect the metal floor by refractory layers from the hot face side, yet the hot syngas can still ingress through the joints of the refractory brick and eventually reach the metal floor. The refractory brick may be eroded or worn off, in which case the protection of the metal floor will be lost. In addition, although the overhanging brick of the prior art is meant to protect the quench ring, the risk of overheating the quench ring is still relatively high as the brick, and its overhanging section, may be eroded. Industry has reported damages and cracks at the quench ring even with overhanging bricks. Finally, the syngas from the reactor typically contains soot and ash particles, which may stick on dry surface and start accumulating, for instance on the quench ring. The soot and ash accumulation at the quench ring may block the water distributor outlet of the quench ring. Once the water distribution of the quench ring is disturbed, the dip tube can experience dry spots and resulting overheating, resulting again in damage to the diptube.

In addition, the material of the dip tube is protected with a water film on the inner surface of the dip tupe, which prevents the buildup of deposits and cools the wall of the dip tube. Inside the dip tube, severe corrosion may occur in case wall sections of the dip tube are improperly cooled or experience alternating wet-dry cycles.

BRIEF DESCRIPTION OF THE INVENTION

It is an object of the disclosure to provide an improved gasification system and method, obviating at least one of the problems described above.

The disclosure provides a gasification system for the partial oxidation of a carbonaceous feedstock to at least provide a synthesis gas, the system comprising:

a reactor chamber for receiving and partially oxidizing the carbonaceous feedstock;

a quench section below the reactor chamber for holding a bath of liquid coolant;

an intermediate section connecting the reactor chamber to the quench section, the intermediate section comprising:

a reactor chamber floor provided with a reactor outlet opening through which the reactor chamber communicates with the quench section to conduct the synthesis gas from the reactor chamber into the bath of the quench section;

at least one layer of refractory bricks arranged on and supported by the reactor chamber floor, the refractory bricks enclosing the reactor outlet opening;

a membrane wall comprising tubes for liquid coolant, the membrane wall comprising at least a first wall section extending downwardly from the reactor outlet opening of the reactor chamber floor; and a pump system communicating with a source of a liquid coolant for circulating the liquid coolant through the tubes of the membrane wall.

In an embodiment, the tubes of the membrane wall together form a substantially gas-tight wall.

In another embodiment, a layer of castable refractory material covers at least part of an inner surface of the first wall section.

Optionally, the layer of castable refractory material extends downwardly from a lower end of the refractory bricks until a lower end of the first wall section.

In an embodiment, the membrane wall comprises a horizontal section extending between at least a part of the reactor chamber floor and the at least one layer of refractory bricks.

The horizontal section of the membrane wall may engage a horizontal section of the reactor chamber floor.

Optionally, the inner diameter of the reactor outlet opening is substantially constant along its length, an upper end of said inner diameter being defined by the lower end of the refractory bricks and a lower end of said inner diameter being defined by the membrane wall and/or by the castable refractory material.

In an embodiment, a dip tube extends from the reactor outlet opening to the bath of the quench chamber, an upper end of the dip tube enclosing the membrane wall, and the upper end of the dip tube being provided with a quench ring for providing liquid coolant to the inner surface of the dip tube.

According to another aspect, the disclosure provides a process for the partial oxidation of a carbonaceous feedstock to at least provide a synthesis gas, comprising the use of a gasification system as described above.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 shows a sectional view of yet another embodiment of the intermediate section of the gasifier.

DETAILED DESCRIPTION OF THE INVENTION

The disclosed embodiments, discussed in detail below, are suitable for gasifier systems that include a reaction chamber that is configured to convert a feedstock into a synthetic gas, a quench chamber that is configured to cool the synthetic gas, and a quench ring that is configured to provide a water flow to the quench chamber. The synthetic gas passing from the reaction chamber to the quench chamber may be at a high temperature. Thus, in certain embodiments, the gasifier includes embodiments of an intermediate section, between the reactor and the quench chamber, that is configured to protect the quench ring or metal parts from the synthetic gas and/or unburnt carbon or molten slag that may be produced in the reaction chamber. The synthetic gas and unburnt carbon and/or molten slag may collectively be referred to as hot products of gasification. A gasification method may include gasifying a feedstock in the reaction chamber to generate the synthetic gas, quenching the synthetic gas in the quench chamber to cool the synthetic gas.

Figure 1:
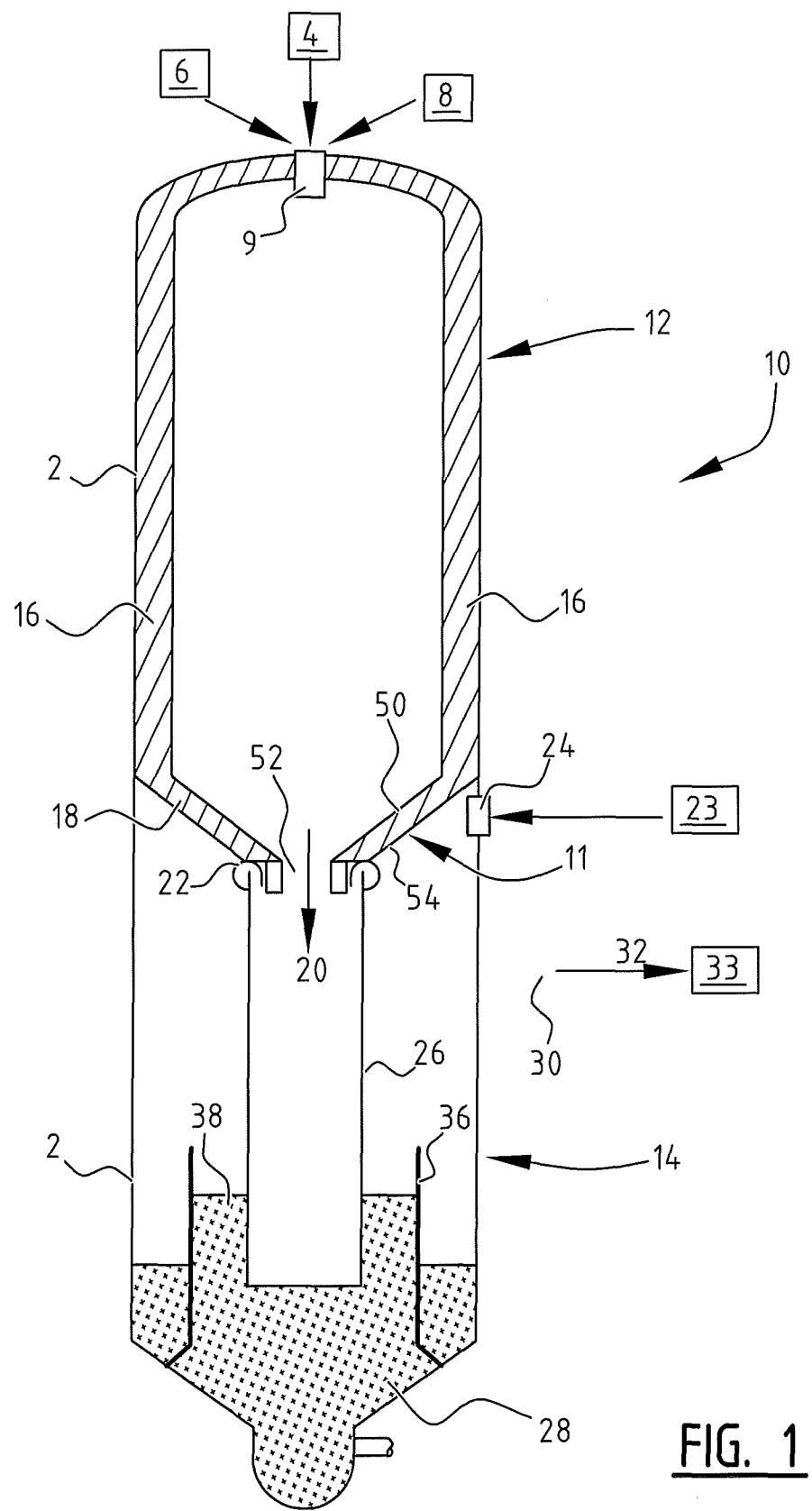
FIG. 1 shows a sectional view of an exemplary embodiment of a gasifier.

FIG. 1 shows a schematic diagram of an exemplary embodiment of a gasifier 10. An intermediate section 11 is arranged between a reaction chamber 12 and a quench chamber 14. A protective barrier 16 may define the reaction chamber 12. The protective barrier 16 may act as a physical barrier, a thermal barrier, a chemical barrier, or any combination thereof. Examples of materials that may be used for the protective barrier 16 include, but are not limited to, refractory materials, refractory metals, non-metallic materials, clays, ceramics, cermets, and oxides of aluminum, silicon, magnesium, and calcium. In addition, the materials used for the protective barrier 16 may be bricks, castable, coatings, or any combination thereof. Herein, a refractory material is one that retains its strength at high temperatures. ASTM C71 defines refractory materials as "non-metallic materials having those chemical and physical properties that make them applicable for structures, or as components of systems, that are exposed to environments above 1,000° F. (538° C.)".

The reactor 12 and refractory cladding 16 may be enclosed by a protective shell 2. The shell is, for instance, made of steel. The shell 2 is preferably able to withstand pressure differences between the designed working pressure inside the reactor, and atmospheric pressure. The pressure difference may for instance be up to 70 barg, at least.

A feedstock 4, along with oxygen 6 and an optional moderator 8, such as steam, may be introduced through one or more inlets into the reaction chamber 12 of the gasifier 10 to be converted into a raw or untreated synthetic gas, for instance, a combination of carbon monoxide (CO) and hydrogen (H2), which may also include slag, unburnt carbon and/or other contaminants. The inlets for feedstock, oxygen, and moderator may be combined in one or more burners 9. In the embodiment as shown, the gasifier is provided with a single burner 9 at the top end of the reactor. Additional burners may be included, for instance at the side of the reactor. In certain embodiments, air or oxygen-enhanced air may be used instead of the oxygen 6. Oxygen content of the oxygen-enhanced air may be in the range of 80 to 99%, for instance about 90 to 95%. The untreated synthesis gas may also be described as untreated gas.

During operation of the gasifier, typical reaction chamber temperatures can range from approximately 2200° F. (1200° C.) to 3300° F. (1800° C.). For liquid fuels, the temperature in the reaction chamber may be around 1300 to 1500° C. Operating pressures can range from 10 to 200 atmospheres. Pressure in the gasification reactor may range from approximately 20 bar to 100 bar. For liquid fuels, the pressure may be in the range of 30 to 70 atmospheres, for instance 35 to 55 bar. Temperature in the reactor may be, for instance, approximately 1300° C. to 1450° C., depending on the type of gasifier 10 and feedstock utilized. Thus, the hydrocarbon comprising fuel that passes through the burner nozzle normally self-ignites at the operating temperatures inside the gasification reactor.

Under these conditions, the ash and/or slag may be in the molten state and is referred to as molten slag. In other embodiments, the molten slag may not be entirely in the molten state. For example, the molten slag may include solid (non-molten) particles suspended in molten slag.

Liquid feedstock, such as heavy oil residue from refineries, may include or generate ash containing metal oxides. Particular wearing associated with liquid fuels, such as heavy oil residue, may include one of more of:
  erosion, as a result of high velocities in combination with hard particles such as metal oxides;
  sticky ash, as elements with a lower melting point can result in slagging;
  sulfidation, as relatively high sulfur content in the feedstock results in corrosion by sulfidation; and
  carbonyl formation, as Nickel (Ni) and iron (Fe) in the oil residue in the presence of CO may form {Ni(CO)$_4$ Fe(CO)$_5$}, which is insoluble in water and may therefore be carried over to gas treatment after quenching.

The high-pressure, high-temperature untreated synthetic gas from the reaction chamber 12 may enter a quench chamber 14 through a syngas opening 52 in a bottom end 18 of the protective barrier 16, as illustrated by arrow 20. In other embodiments, the untreated synthetic gas passes through the syngas cooler before entering the quench chamber 14. In general, the quench chamber 14 may be used to reduce the temperature of the untreated synthetic gas. In certain embodiments, a quench ring 22 may be located proximate to the bottom end 18 of the protective barrier 16. The quench ring 22 is configured to provide quench water to the quench chamber 14.

As illustrated, quench water 23, for instance from a gas scrubber unit 33, may be received through a quench water inlet 24 into the quench chamber 14. In general, the quench water 23 may flow through the quench ring 22 and down a dip tube 26 into a quench chamber sump 28. As such, the quench water 23 may cool the untreated synthetic gas, which may subsequently exit the quench chamber 14 through a synthetic gas outlet 30 after being cooled, as illustrated by arrow 32.

In other embodiments, a coaxial draft tube 36 may surround the dip tube 26 to create an annular passage 38 through which the untreated synthetic gas may rise. The draft tube 36 is typically concentrically placed outside the lower part of the dip tube 26 and may be supported at the bottom of the pressure vessel 2.

The synthetic gas outlet 30 may generally be located separate from and above the quench chamber sump 28 and may be used to transfer the untreated synthetic gas and any water to, for instance, one or more treatment units 33. The treatment units may include, but are not limited to, a soot and ash removal unit, a syngas scrubbing unit, units to remove halogens and/or sour gas, etc. For example, the soot and ash removal unit may remove fine solid particles and other contaminants. The syngas treatment units, such as a scrubber, may remove entrained water and/or corrosive contaminants such as H2S and ammonia, from the untreated synthetic gas. The removed water may then be recycled as quench water to the quench chamber 14 of the gasifier 10. The treated synthetic gas from the gas scrubber unit 33 may ultimately be directed to a chemical process or a combustor of a gas turbine engine, for example.

The intermediate section 11 may comprise a cone shaped section 50 ending in a reactor outlet 52 at the bottom. The cone shaped section may have an appropriate angle α (See FIG. 2) with respect to the vertical perpendicular line 58 of the reactor, for instance in the range of 25 to 75 degrees, for instance about 60 degrees. The total angle of the cone, i.e. 2×α, may be about 50 to 150 degrees, for instance about 120 degrees. The cone may comprise layers of refractory bricks or castables 16. The refractory bricks may be supported by a metal cone support 54. At the bottom of the cone, the metal cone support may become horizontal to support the last part of the refractory bricks.

Figure 2:
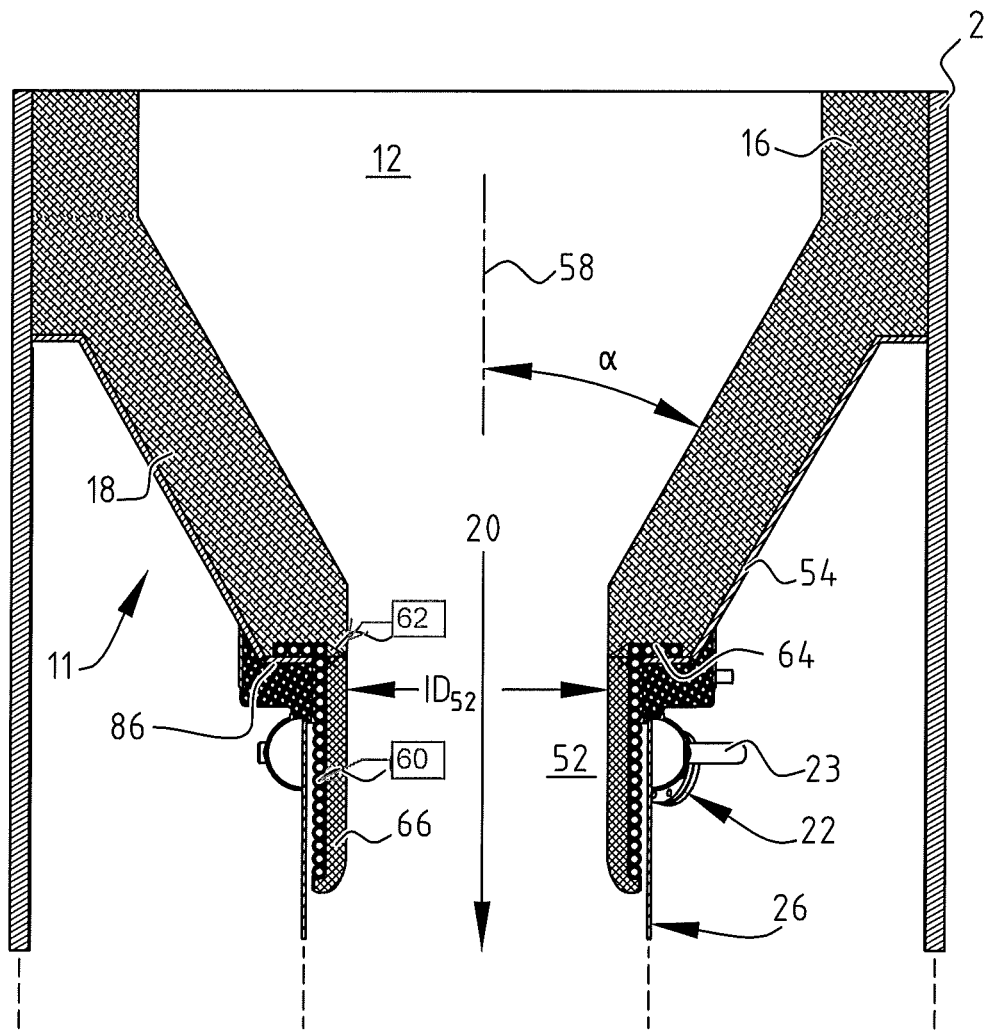
FIG. 2 shows a sectional view of an embodiment of an intermediate section of the gasifier.
Figures 3A, 3B:
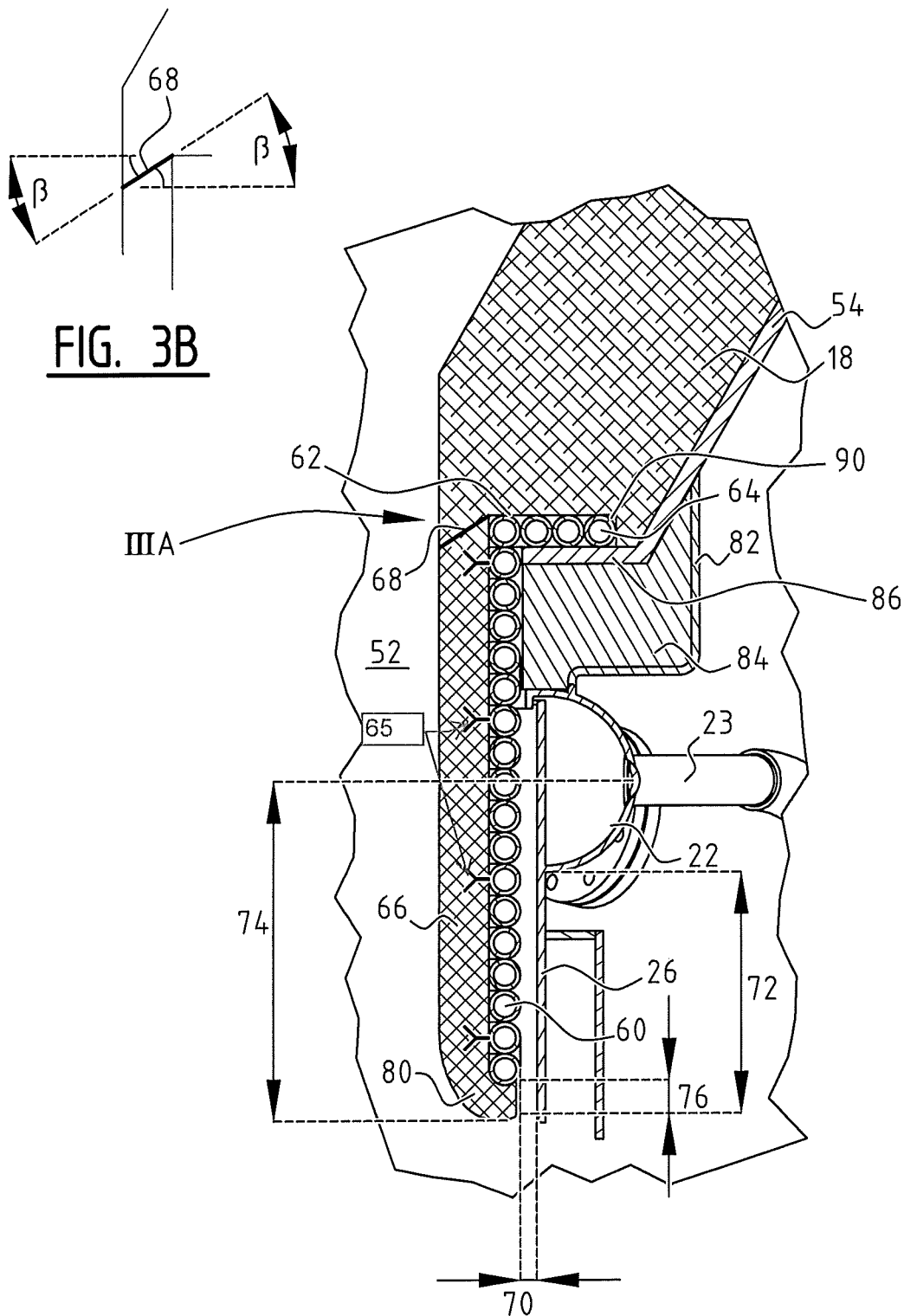
FIG. 3A shows a detail in cross section of the embodiment of FIG. 2.
FIG. 3B shows a schematic indication of the intersection indicated by IIIA in FIG. 3A.

FIGS. 2 and 3 show an embodiment of the intermediate section 11 of a gasifier, comprising the protective barrier 16. The protective barrier may 16 may comprise, for instance, a number of layers of refractory bricks, for instance two or three layers. The lower section 18 may comprise the same number of layers, or less. The types of these three layer bricks may be identical to the bricks included in the cylindrical part of the reactor 12. At the bottom of the cone, near the syngas opening 52, the refractory 16 ends at an outlet dimension, meaning the inner diameter $ID_{52}$ of the opening 52. The inner diameter of the opening 52 may be substantially constant along its vertical length.

At least part of a membrane wall section 60 extends downwardly from the lower end 62 of the protective barrier 16. The membrane wall section may also comprise a top section 64, which may extend horizontally between at least a part of the bottom end 62 of the protective barrier 16 and the horizontal end 86 of the metal gasifier floor 54.

The membrane wall sections 60, 64 herein may comprise tubes filled with cooling fluid, or with a mixture of fluidic cooling fluid and vaporized cooling fluid, typically water and steam. Cooling fluid can be supplied via supply lines (not shown). The cooling fluid inside the tubes is heated by heat exchange with the surrounding structures and/or the syngas. The fluid may be at least partly vaporized inside the tubes, so that the temperature of the mixture in the tubes will be constant at about the boiling temperature of the cooling fluid at the working pressure in the tubes. The cooling fluid in the tubes may be discharged to a discharge header (not shown) and subsequently cooled before recycling to the supply header.

The tubes 62 may have a spiralling setup of interconnected adjacent tubes, and/or comprise separate adjacent tubes. All tubes, adjacent and/or spiraling, may be connected to the supply line via a common header. Adjacent tubes 62 may be interconnected to form a substantially gas-tight wall structure. The gas-tight membrane wall structure protects the quench ring enclosing the vertical membrane wall section from the reaction products and the corrosive substances therein.

The inner surface of the membrane wall section 60, facing the syngas opening 52, may be provided with a protective layer 66 to protect the membrane wall against corrosion and potential overheating by the hot syngas. The protective layer may, for instance, comprise a castable refractory material used to create a monolithic lining covering the inner surface of the membrane wall section 60 along the syngas opening 52.

There is a wide variety of raw materials that are suitable as refractory castable, including chamotte, andalusite, bauxite, mullite, corundum, tabular alumina, silicon carbide, and both perlite and vermiculite can be used for insulation purposes. A suitable dense castable may be created with high alumina (Al2O3) cement, which can withstand temperatures from 1300° C. to 1800° C.

The castable lining 66 may be monolithic, meaning it lacks joints and thus prevents ingress of syngas, protecting the membrane wall section 60. An interface 68 between the castable lining 66 and the bricks 18 may slope downwardly at an angle β, in the direction of the syngas flow to prevent ingress of hot syngas. The angle β may be in the range of 15 to 60 degrees, for instance about 30 degrees or 45 degrees.

The vertical membrane wall section 60 may be provided with a number of anchor structures, extending into the castable lining 66 to provide support to the latter.

In use, the membrane wall cools the heat fluxes from both the hot syngas side inside opening 52 and the recirculated syngas side, i.e. the side of the membrane wall facing the upper end of the quench chamber. During operation, ash in the feedstock may be converted into molten slag. The molten slag, cooled by the membrane wall, may vitrify to form a protective layer against slag erosion of the refractory lining 66.

The diptube 26 may be arranged at a horizontal distance 70 with respect to the membrane wall section 60. A lower end of the quench ring 22 may be arranged at a vertical distance 72 above the lower end of the membrane wall section. In a practical embodiment, a distance 74 between the midline of the quench ring 22 and a lower end of the membrane wall section 60 exceeds 30 cm, and is for instance about 40 cm. The horizontal distance 70 exceeds, for instance, 2 cm, and is for instance in the range of 3 to 10 cm.

In practice, the membrane wall 60 may face the hot syngas from the reactor directly, without cladding. However, the tubes, for instance made of carbon steel, would be prone to H2S corrosion depending on the sulphur content in the feedstock. Applying the cladding 66 may be considered, if justified with the lifetime of the cooling tubes in membrane wall section 60. The expected lifetime may be limited to a couple of years, for instance 2 to 3 years for an oil residue feedstock. Applying castable lining 66 is a preferred embodiment, economically. Based on industrial experience, the lower end of the castable layer is provided with a rounded edge 80 which protects the lower end of the membrane wall section 60 from directly contacting the syngas. Additional strengthening may be provided to prevent the tip 80 of the castable from falling off, for instance by anchor structures 65.

In an exemplary embodiment, the cooling capacity of the membrane wall 60 may be calculated using the following assumptions:

Pressure and temperature of the cooling water inside the cooling wall of the tubes: Normal 74 barg, 195° C. up to a maximum of 78 barg, 210° C.;

Syngas flow, pressure and temperature from the reactor: 6.8 kg/s, 45 barg, 1475° C.;

Cooling area of the membrane wall section 60: 2.6 m2;

Material of the tubes of the membrane wall: high-strength low alloy steel (corrosion resistant steel);

Tube dimensions of may be about 38 mm diameter×5.6 mm wall thickness. The tubes may provide two parallel flow passes, meaning the membrane wall section 60 comprises two separate, intertwined helically spiralling tubes. The intertwined tubes limit the pressure loss of the cooling surface;

water is not allowed to evaporate in the cooling tubes (water outlet temperature of saturating steam temperature minus safety margin of 20° C., Arvos design rule), resulting in a minimum cooling water flow of 7394 kg/h (=8.45 m$^3$/h at 874.9 kg/m$^3$) for the base line case, and 8522 kg/h (=9.94 m$^3$/h at 857.6 kg/m$^3$) for the maximum load case.

The above resulted in an exemplary total cooling duty of the membrane wall section 60 in the order of 720 kW.

Optionally, seals may be included to prevent syngas from leaking from or to the top of the quench chamber between the quench ring 22 and the membrane wall 60. One seal option comprises an L-shaped sealing plate 82. The space between the sealing plate 82 and the metal gasifier floor 54, 86 and/or the membrane wall 60 may be filled with suitable refractory material 84 (FIG. 3). Another option comprises a horizontal sealing plate (not shown) directly on top of the quench ring 22. The first option is preferred as is it relatively easy to maintain.

An expansion joint 90 may be included at or near the interface between the floor 54, the membrane wall 60, and the protective barrier 16. See FIG. 3. The expansion joint or movement joint is an assembly designed to safely absorb the heat-induced expansion and contraction of construction materials, to absorb vibration, between the floor, the membrane wall, and the protective barrier.

A second seal (not shown) may be provided to prevent hot syngas, which may potentially leak through refractory joints of the protective barrier 18, from reaching the gap between the cooling tubes of the horizontal membrane wall section 64 and the metal gasifier floor 86. This also prevents the syngas from further leaking towards the quench ring 22 via the seal area 84. Multiple options and materials can be considered for the second seal to seal the gap between the cooling tubes and the metal support 86. For instance, the membrane wall may be sealed directly to the horizontal floor section 86. Also, the second seal functionality may be included in the expansion joint 90.

The embodiment of FIG. 2 protects the supporting structure 86 of the intermediate section 11, including the throat section 54 and the bottom 86 of the cone, and prevents corrosion of the metal gasifier floor and/or the refractory lining by keeping the metal floor relatively cool by using the water cooled membrane wall. In a preferred embodiment, the membrane wall is designed to keep the temperature of the metal floor 86 above the dew point of the syngas, thus preventing dew point corrosion of the metal.

Figure 4:
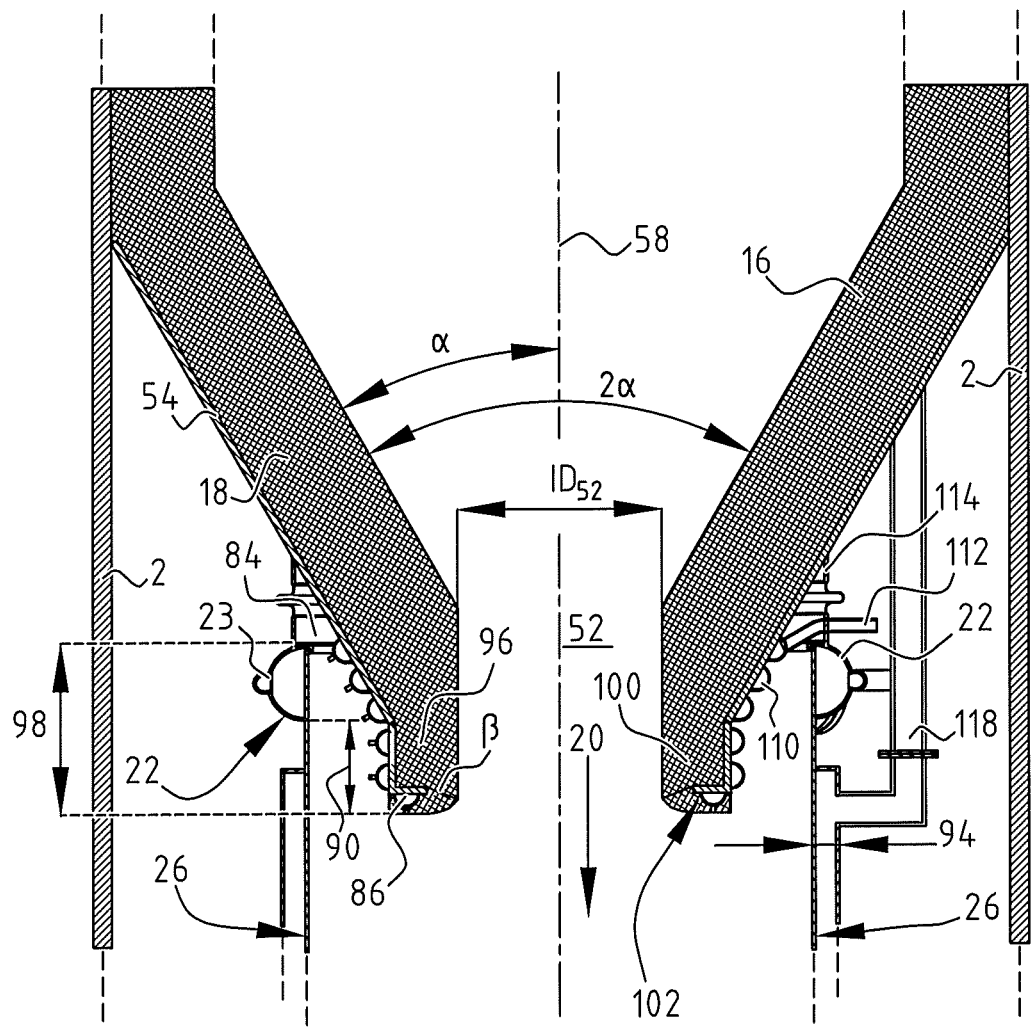
FIG. 4 shows a sectional view of another embodiment of the intermediate section of the gasifier.
Figure 5:
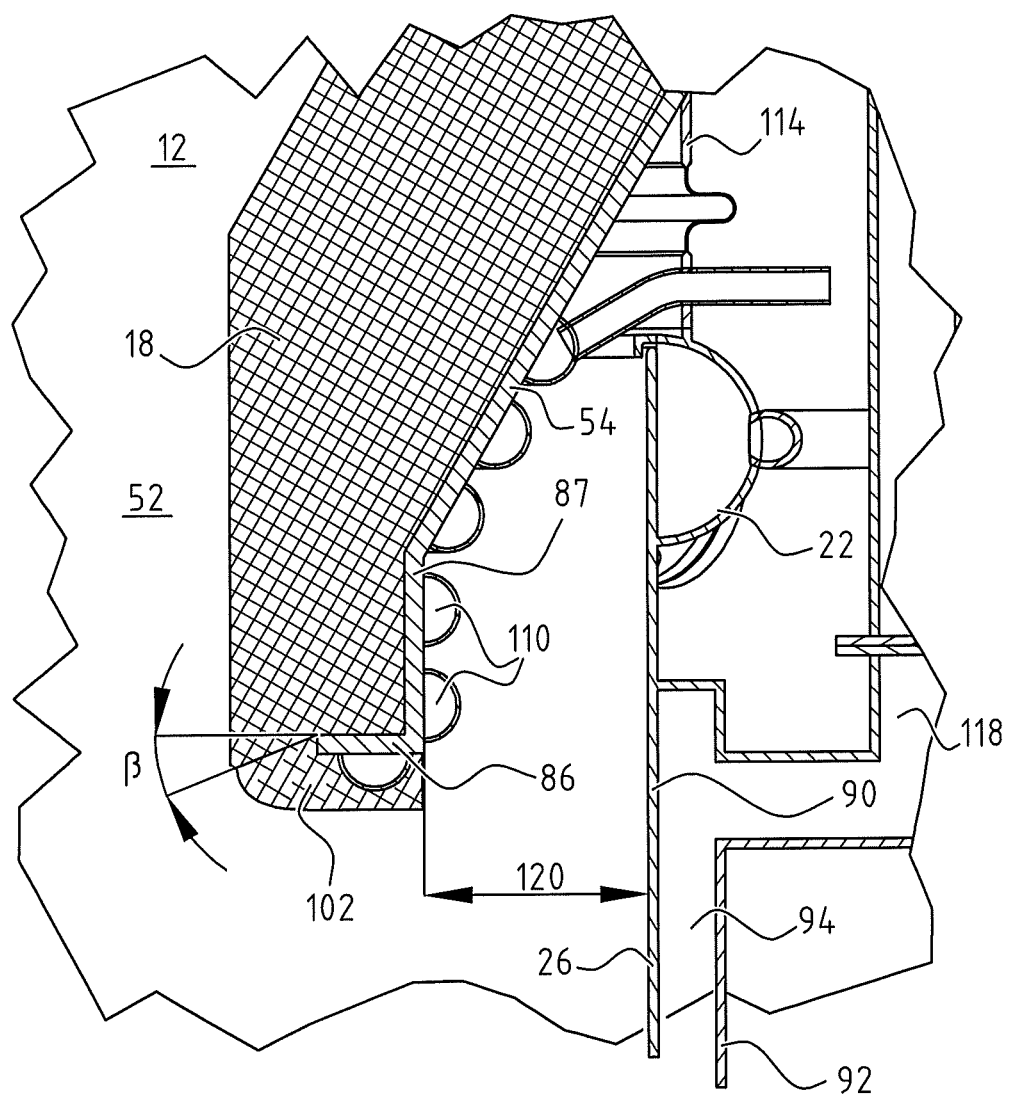
FIG. 5 shows a detail of the embodiment of FIG. 4.

The embodiment shown in FIGS. 4 and 5 maximizes the use of refractory bricks in the reactor outlet section 52. The diameters of the reactor outlet 52 and the dip-leg tube are modified to accommodate the requirement of refractory material 18. The inner diameter $ID_{52}$ has, for instance, a minimum requirement of about 60 cm or more (manhole criterium, i.e. preferably a person should be able to pass through).

The quench ring 22 is provided at the top end of the dip tube 26. The dip tube commences at the quench ring, which is located a distance 90 above the lower end of the syngas outlet 52. Quench water supplied by the quench ring can flow along the inside surface of the dip tube 26 all the way down to the water bath 28.

In an embodiment, an optional cooling enclosure is arranged on the outside of the dip tube. The cooling enclosure comprises, for instance, a cylindrical element 92 with closed upper end 93 and lower end (not shown), leaving an annular space 94 between the cylinder 92 and the outer diameter of the diptube 26. Cooling fluid, such as water, may be supplied and circulated through the annular space 94 via cooling fluid supply lines 118. The annulus 94 may have a width in the order of 1 to 10 cm.

The top part of the cone section 18 may comprise, for instance, three layers of refractory bricks. The bricks may be identical to the types used in the cylindrical part of the reactor. At the cone bottom 96, the thickness of the brick layer may be reduced, for instance to two layers of bricks. At the syngas outlet 52, the refractory material 18 continues vertically downwards. The refractory material 18 extends downwardly. A distance 98 between the low edge of the bricks 18 and the top of the quench ring may at least be 40 cm.

The gasifier floor may include a vertical section 87, extending between the horizontal section 86 and the conical section 54. The lower end 100 of the bricks 18 is supported by the horizontal metal support 86 of the metal floor 54. Optionally, a layer of castable refractory material 102, for instance as described above, may be applied to the lower end 100 of the bricks and the horizontal metal floor part 86. The castable refractory layer 102 may be omitted on the bricks 18, as the heat flux mainly comes from the re-circulated syngas, which has a lower temperature than the syngas 20 directly output from the reactor. The colder the surface is, the lower the ash accumulation tendency is. For the bottom horizontal part 86, the castable layer 102 is recommended to protect the steel from corrosion by the syngas.

At least one cooling conduit is arranged on the outer surface of the metal floor 54, 86, i.e. on the side facing the quench ring 22. The at least one cooling conduit may comprise cooling tubes 110. In cross-section, as shown in FIG. 4, the cooling conduit 110 may comprise half pipes applied directed to the surface of the metal floor 54. An open side of the half tubes faces the metal floor, allowing cooling fluid in the tubes to directly engage and cool the metal floor. The cooling conduit 110 may comprise separate adjacent tubes, and/or a spiralling interconnected tube. The cooling tubes are connected to a supply line 112 of cooling fluid, typically water. The cooling conduits 110 may have any suitable shape in cross section, allowing the cooling fluid in the conduit to engage and cool the reactor chamber floor. Alternative shapes of the conduit in cross section may be rectangular or triangular.

The half tubes 110 are relatively easy to connect to the metal floor, for instance by welding. The temperature however may vary along the metal floor, as the half pipes have a lower temperature in the middle of one of the tubes 110 and a higher temperature at the interface or gap between two adjacent pipes 110. The cooling capacity of the tubes can be designed accordingly, based on the temperature regime and the conductivity of the material of the metal floor 54. I.e. the tubes can be designed such that the maximum temperature during use, at the interface between adjacent tubes, will be below a predetermined safe threshold temperature to prevent corrosion or wear of the floor sections 54, 86.

The insulation capacity provided by the refractory bricks 18 may exceed the insulation capacity of the castable layer in the embodiment of FIG. 2. The cooling capacity required in this embodiment may therefore be lower. In a practical embodiment, a total cooling capacity of the half tubes 110 of 720 kW or less may be sufficient.

The optional seal between the quench ring 22 and the gasifier floor 54 may be the same as described above or shown in FIG. 2. Alternatively, the system may include a vertical sealing plate 114 between the floor 54 and the quench ring. The floor 54, 86 can be gas tight, and will prevent syngas leaking from the reactor towards the quench ring 22. Sealing mass 84 is optional.

In a practical embodiment, the inner diameter of the reactor outlet 52 may be about 60 cm. The outer diameter of the quench ring may be about 170 cm. The inner diameter $ID_2$ of the pressure vessel 2 may be about 250 to 300 cm, leaving space between the quench ring and the vessel 2 for piping 116 and cone supports (not shown). The flux of quench water to the quench ring may be increased or decreased, with increased or decreased quench ring diameter respectively.

FIG. 6 shows an embodiment, combining features of the embodiments described above. The intermediate section 11 comprises a conical floor section 54, provided with a protective barrier 18 facing the internal space of the reactor 12. The barrier 18 preferably comprises refractory bricks or a similar refractory material.

The conical floor section 54 is connected to cylindrical floor section 87. A lower end of the cylindrial floor section may be provided with a horizontal floor section 86. The inner surface of the cylindrical floor section 86 may be provided with castable refractory material 66. Suitable materials of structure of the castable material 66 may be similar to the embodiment of FIG. 2 described above. Also, the castable material may enclose the lower end of the floor, for instance the castable 80 may cover a underside of the horizontal floor section 86. The castable 80 can be sufficiently strong to withstand the temperature regime in this section of the gasification system, which is already lower than the temperature inside the reactor 12.

The diptube 26 has in inner diameter $ID_{26}$ exceeding the outer diameter $OD_{52}$ of the syngas outlet 52. At least a part of the upper end of the diptube encloses the outer surface of the syngas opening 52. The quench ring 22 is arranged at the top end of the diptube, above the lower end of the syngas outlet 52.

In an embodiment, the quench ring may comprise a vertical wall section 210. The wall section 210 may be connected to an upper end 206 of the dip tube. In addition, the quench ring may comprise a tubular fluid container 212 enclosing the vertical wall section 210. The fluid container may comprise a (for instance straight) lip or cap 214 enclosing a top edge 216 of the vertical wall 210. The lip leaves sufficient space, such as a slit 218, between the lip and the top of the vertical wall to allow passage of cooling fluid.

The floor sections 54, 87, 86 are connected, and prevent potential leakage of syngas from the reactor 12 to the quench ring 22.

Cooling tubes 110 are provided directly on at least part of floor of the gasifier, for instance on part of the floor sections 54, 86 and/or 87. The cooling tubes have a curved surface facing the quench ring 22. Structure and materials of the cooling tubes can be similar as described with respect to the embodiment of FIG. 4. The cooling tubes comprise half pipes applied directed to the surface of the metal floor 54. An open side of the half tubes faces the metal floor, allowing cooling fluid in the tubes to directly engage and cool the metal floor.

The cooling capacity of the tubes can be designed based on the temperature regime and the conductivity of the material of the metal floor 54. I.e. the tubes can be designed such that the maximum temperature during use, at the interface between adjacent tubes, will be below a predetermined safe threshold temperature to prevent corrosion or wear of the floor sections 54, 86, 87.

The insulation capacity provided by the castable refractory material 66 may require a cooling capacity similar to the embodiment of FIG. 2. Total cooling capacity of the half tubes 110 in the order of 650 to 750 kW may be sufficient, for instance.

Figure 7A:
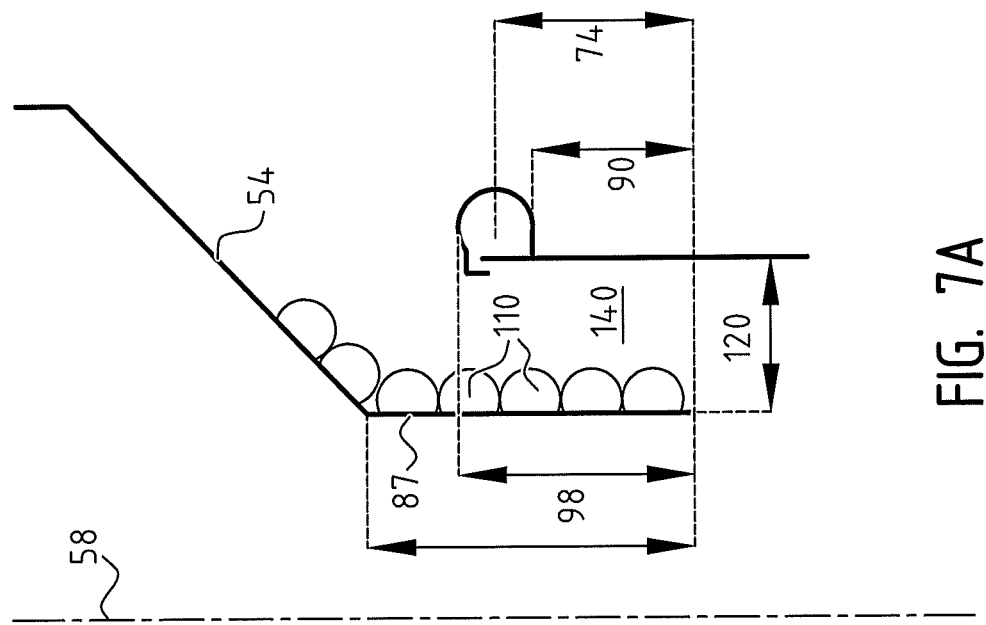
FIGS. 7A and 7B show sectional views of respective embodiments of the intermediate section of the gasifier.
Figure 7B:
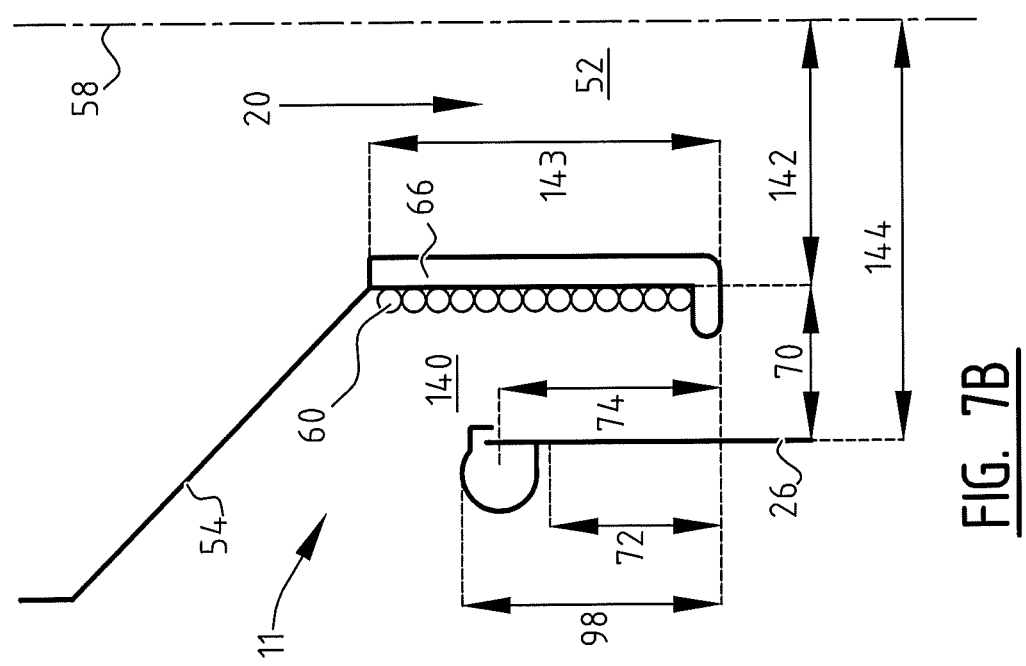

FIGS. 7A and 7B schematically indicate distances between respective elements of the intermediate section 11.

FIG. 7A shows the diptube 26 arranged at a horizontal distance 70 with respect to the membrane wall section 60. A lower end of the quench ring 22 is arranged at a vertical distance 72 above the lower end of the membrane wall section 60. The midline of the quench ring 22 is at a distance 74 to the lower end of the membrane wall section 60.

FIG. 7B shows the diptube 26 arranged at a horizontal distance 120 with respect to the vertical floor section 87. A lower end of the quench ring 22 is arranged at a vertical distance 90 above the lower end of the vertical floor section 87. The midline of the quench ring 22 is at a distance 74 to the lower end of the vertical floor section 87. The dip tube commences at the quench ring. The lower end of the quench ring is located a distance 90 above the lower end of the syngas outlet 52. The low edge of the vertical floor section 87 is at about a distance 98 to the top of the quench ring.

Referring to FIGS. 7A, 7B, the horizontal distance 70, 120 may allow a space 140 between the dip tube and the outer surface of the syngas outlet 52. The space 140 is relatively cool, due to the cooling fluid from the quench ring 22. Further cooling is provided by the half cooling tubes 110 (FIG. 7A) or the membrane wall section 60 (FIG. 7B) respectively. Also, gas circulation in the space 140 is limited, limiting entrance of hot syngas. The limited gas circulation is for instance due to the closure at the top end of the space 140 (See for instance 82, 114 in FIGS. 3, 4).

The quench ring is located at a distance above the lower edge of the syngas outlet 52. The quench ring is thus kept relatively cool during operation, being shielded from hot syngas, as well as from slag and ash. This reduces wear and corrosion of the quench ring, and significantly increases the lifespan. Parts exposed to the hot syngas, such as the dip tube and the wall of the syngas outlet 52, can be cooled by cooling fluid, also limiting wear and increasing the lifespan.

Once the quench ring water distribution is disturbed, the dipleg tube could experience dry spots and overheating which may lead to damage of the dip tube. The industry has also reported this issue from long term operation. The present disclosure prevents disturbance of the quench ring and, by shielding the quench ring away from the reactor outlet. The top of the quench ring may be located at least 40 cm above, and 20 cm horizontally away from the syngas outlet. This design would greatly reduce soot and ash accumulation at or near the quench ring, thus reducing disturbance of the quench ring water flow. The latter ensures continuous operation of the quench ring and an associated water film on the inner surface of the dip tube, preventing dry spots and damage to the dip tube, increasing lifespan, and limiting maintenance.

The distances shown in FIGS. 7A, 7B may be within a preferred range to optimize the advantages described above. Horizontal distance 70, 120 preferably exceeds a predetermined minimum threshold, to allow unrestricted flow of the cooling fluid from the quench ring and/or to allow easy access for maintenance. On the other hand, the horizontal distance may be limited to an upper threshold, to limit circulation and to prevent syngas from entering the space 140. The horizontal distance may exceed, for instance, 1 to 3 cm. The horizontal distance may be in the range of 5 to 20 cm.

The vertical distances 72, 90 may exceed a minimum threshold to ensure proper shielding of the quench ring from the hot syngas and corrosive elements therein. The vertical distance 72, 90 may exceed 10 cm, and is for instance at least 20 cm. The vertical distance 98 may exceed 30 cm, and is for instance at least 40 to 45 cm.

Diameter of the outlet 52 is, for instance, at least 60 cm, and the outlet radius 142 is at least 30 cm. Diptube radius 144 is equal to horizontal distance 70, 120 plus outlet radius 142.

Optimal results with respect to maximum cooling combined with minimum circulation of syngas in the area 140 can be provided by certain relative sizes. For instance, vertical distance 98 with respect to the vertical length 143 of the outlet 52 may be in the preferred range of 60 to 85%. I.e. vertical distance 98 is about 0.6 to 0.85 times the vertical length 143. The horizontal distance 70, 120 may be in the range of 2 to 20% of the diptube radius 144. The horizontal distance 70, 120 may preferably be in the range of 2 to 50% of the vertical distance 98.

In a practical embodiment, the temperature in the reactor chamber may typically be in the range of 1300 to 1700° C. When using a fluid carbonaceous feedstock comprising heavy oil and/or oil residue, the temperature in the reactor is, for instance, in the range of 1300 to 1400° C. The pressure in the reactor chamber may be in the range of 25 to 70 barg, for instance about 50 to 65 barg.

The metal floor may be made of the same pressure vessel metallurgy as the gasifier shell or vessel. The metal floor may also be made of a different metallurgy as the gasifier shell or vessel.

The embodiments of the present disclosure enable to effectively limit the temperature of the gasifier floor, thus limiting corrosion and wastage thereof. In addition, the embodiments support the refractory material at or near the syngas opening. The cooling of the gasifier floor herein also limits the temperature in the refractory material adjacent the gasifier floor, thus also limiting erosion of the refractory. The embodiments of the present disclosure provide an improved intermediate section for a gasifier for liquid feedstock, having an increased lifespan and reduced wear. The embodiment of the disclosure are relatively simple and robust, while limiting downtime for maintenance.

The present disclosure is not limited to the embodiments as described above, wherein many modifications are conceivable within the scope of the appended claims. Features of respective embodiments may for instance be combined.

The invention claimed is:

1. A gasification system for the partial oxidation of a carbonaceous feedstock to at least provide a synthesis gas, the system comprising:
   a reactor chamber for receiving and partially oxidizing the carbonaceous feedstock;
   a quench section below the reactor chamber for holding a bath of liquid coolant; and
   an intermediate section connecting the reactor chamber to the quench section, the intermediate section comprising:
      a reactor chamber floor provided with a reactor outlet opening through which the reactor chamber communicates with the quench section to conduct the synthesis gas from the reactor chamber into the bath of the quench section;
      at least one layer of refractory bricks arranged on and supported by the reactor chamber floor, the refractory bricks enclosing the reactor outlet opening; and
      a membrane wall comprising tubes for liquid coolant, the membrane wall comprising at least a first wall section extending downwardly from the reactor outlet opening of the reactor chamber floor, the first wall section having a lower end;
   a pump system communicating with a source of a liquid coolant for circulating the liquid coolant through the tubes of the membrane wall; and
   a dip tube extending from the reactor outlet opening to the bath of the quench section, an upper end of the dip tube being provided with a quench ring for providing liquid coolant to the inner surface of the dip tube, the quench ring having a lower end, the quench ring enclosing an outer surface of the first wall section of the membrane wall;
   wherein the lower end of the quench ring is arranged at a vertical distance above the lower end of the first wall section of the membrane wall.

2. The gasification system of claim 1, the tubes of the membrane wall together forming a gas-tight wall.

3. The gasification system of claim 1, comprising a layer of castable refractory material covering at least part of an inner surface of the first wall section of the membrane wall.

4. The gasification system of claim 3, the layer of castable refractory material extending downwardly from a lower end of the refractory bricks until a lower end of the first wall section.

5. The gasification system of claim 3, wherein the reactor outlet opening has an inner diameter, the inner diameter of the reactor outlet opening being constant along its length, an upper end of said inner diameter being defined by the at least one layer of refractory bricks and a lower end of said inner diameter being defined by the castable refractory material on the first wall section.

6. The gasification system of claim 1, wherein the membrane wall comprises a horizontal section extending between at least a part of the reactor chamber floor and the at least one layer of refractory bricks.

7. The gasification system of claim 6, the horizontal section of the membrane wall engaging a horizontal section of the reactor chamber floor.

8. The gasification system of claim 1, wherein the reactor outlet opening has an inner diameter, the inner diameter of the reactor outlet opening being constant along its length, an upper end of said inner diameter being defined by the at least one layer of refractory bricks and a lower end of said inner diameter being defined by the first wall section of the membrane wall.

9. The gasification system of claim 1, comprising a seal for sealing a space between the quench ring and the reactor chamber floor.

10. The gasification system of claim 9, comprising a sealing mass filling a space between the seal, the reactor chamber floor, and the quench ring.

11. The gasification system of claim 1, a vertical distance from a lower edge of the first wall section of the membrane wall to a top of the quench ring being about 0.6 to 0.85 times the vertical length of the reactor chamber outlet.

12. The gasification system of claim 1, wherein the dip tube has a dip tube radius, and wherein a horizontal distance between the first wall section of the membrane wall and the dip tube is in a range of 2 to 20% of the dip tube radius.

13. The gasification system of claim 1, the horizontal distance between the first wall section of the membrane wall and the dip tube being in a range of 2 to 50% of the vertical distance from a lower edge of the first wall section to a top of the quench ring.

14. The gasification system of claim 1, wherein the carbonaceous feedstock is a liquid feedstock comprising oil or heavy oil residue.

15. A gasification process for the partial oxidation of a carbonaceous feedstock to at least provide a synthesis gas, comprising
 gasifying the carbonaceous feedstock in the gasification system according to claim 1 to provide the synthesis gas.

* * * * *